(12) United States Patent
Yasuda et al.

(10) Patent No.: US 11,188,815 B2
(45) Date of Patent: Nov. 30, 2021

(54) WEIGHT SHIFTING FOR NEUROMORPHIC SYNAPSE ARRAY

(71) Applicant: INTERNATIONAL BUSINESS MACHINES CORPORATION, Armonk, NY (US)

(72) Inventors: Takeo Yasuda, Nara (JP); Junka Okazawa, Yamashina-ku (JP); Kohji Hosokawa, Ohtsu (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 390 days.

(21) Appl. No.: 16/241,530

(22) Filed: Jan. 7, 2019

(65) Prior Publication Data
US 2020/0218963 A1   Jul. 9, 2020

(51) Int. Cl.
| G06N 3/063 | (2006.01) |
| G06N 20/00 | (2019.01) |
| G06N 3/08 | (2006.01) |
| G06N 3/04 | (2006.01) |

(52) U.S. Cl.
CPC .......... *G06N 3/063* (2013.01); *G06N 3/0481* (2013.01); *G06N 3/084* (2013.01); *G06N 20/00* (2019.01)

(58) Field of Classification Search
CPC ................. G06N 3/063; G06F 2207/3892
See application file for complete search history.

(56) References Cited

U.S. PATENT DOCUMENTS

| 10,242,737 | B1 | 3/2019 | Lin et al. |
| 10,572,799 | B2 | 2/2020 | Hosokawa et al. |
| 10,671,911 | B2 | 6/2020 | Ritter et al. |
| 2013/0046716 | A1* | 2/2013 | Chan ...................... G06N 3/049 706/18 |
| 2016/0371583 | A1* | 12/2016 | Hosokawa ............. G06N 3/063 |
| 2017/0110187 | A1* | 4/2017 | Whitaker ........... G11C 13/0023 |
| 2017/0185890 | A1 | 6/2017 | Yasuda et al. |

(Continued)

OTHER PUBLICATIONS

H. Jiang et al., "Pulse-Width Modulation based Dot-Product Engine for Neuromorphic Computing System using Memristor Crossbar Array," 2018 IEEE International Symposium on Circuits and Systems (ISCAS), Florence, Italy, 2018, pp. 1-4, doi: 10.1109/ISCAS. 2018.8351276. (Year: 2018).*

(Continued)

*Primary Examiner* — Kakali Chaki
*Assistant Examiner* — Johnathan R Germick
(74) *Attorney, Agent, or Firm* — Tutunjan & Bitetto, P.C.; Randall Bluestone

(57) ABSTRACT

A neuromorphic synapse array is provided which ensures that a neuron model as such McCulloch-Pitts is dependent on nonlinearity with a single polarity weight cell. The neuromorphic synapse array includes a plurality of synaptic array cells, a plurality of operation column arrays, and a reference column array. The synaptic array cells respectively have a single polarity synapse weight and are classified into operation synapse cells and reference synapse cells for shifting a product-sum of the operation synapse cells. The operation column arrays are defined by the operation synapse cells aligned in column of the array. The reference column array is defined by the reference synapse cells aligned in column of the array.

20 Claims, 11 Drawing Sheets

(56) References Cited

U.S. PATENT DOCUMENTS

| | | | |
|---|---|---|---|
| 2018/0197074 A1 | 7/2018 | Friedman et al. | |
| 2019/0164044 A1* | 5/2019 | Song | G11C 11/54 |
| 2019/0354845 A1 | 11/2019 | Yasuda et al. | |
| 2019/0392881 A1 | 12/2019 | Rakshit et al. | |
| 2020/0020393 A1* | 1/2020 | Al-Shamma | G11C 16/08 |
| 2020/0202206 A1 | 6/2020 | Rummens et al. | |
| 2020/0218963 A1 | 7/2020 | Yasuda et al. | |

OTHER PUBLICATIONS

Andrews, B. (1948). Methods of modulation. (Doctoral dissertation, Dudley Knox Library), https://core.ac.uk/download/pdf/36724361.pdf (Year: 1948).*

S. N. Truong, & K. Min (2014). New Memristor-Based Crossbar Array Architecture with 50-\% Area Reduction and 48-\% Power Saving for Matrix-Vector Multiplication of Analog Neuromorphic Computing. Journal of Semiconductor Technology and Science, 14, 356-363. (Year: 2014).*

Gokmen, Tayfun, et al. "Acceleration of deep neural network training with resistive cross-point devices: design considerations," Frontiers in neuroscience, Jul. 2016, 19 pages. 10, 333.

Zhang, Yang, et al. "Memristor-based circuit design for multilayer neural networks," IEEE Transactions on Circuits and Systems I: Regular Papers, Feb. 2018, pp. 677-686, 65, 2.

Burr, G.W., et al. "Large-scale neural networks implemented with non-volatile memory as the synaptic weight element: Comparative performance analysis (accuracy, speed, and power)," Electron Devices Meeting (IEDM), 2015 IEEE International, IEEE, Dec. 2015, 3 pages.

Lim, Suhwan, et al. "Adaptive learning rule for hardware-based deep neural networks using electronic synapse devices," Neural Computing and Applications, 2017, pp. 1-31.

Ambrogio et al., "Equivalent-accuracy accelerated neuralnetwork training using analogue memory", Nature. vol. 558. Jun. 7, 2018. pp. 60-81.

Burr et al., "Experimental demonstration and tolerancing of a large-scale neural network (165,000 synapses), using phase-change memory as the synaptic weight element", IEEE Transactions on Electron Devices. International Electron Devices Meeting (IEDM14) vol. 62, No. 11. Jul. 7, 2015. pp. 697-700.

Burr et al., "Neuromorphic computing using non-volatile memory", Advances in Physics:X 2016. vol. 2, No. 1. Dec. 5, 2016. https://www.tandfonline.com/doi/full/10.1080/23746149.2016.1259585. pp. 89-124.

Mell et al., "The NIST Definition of Cloud Computing", National Institute of Standards and Technology, Special Publication 800-145, Sep. 2011, pp. 1-7.

Xiao et al., "Analog architectures for neural network acceleration based on non-volatile memory", Appl. Phys. Rev. 7. vol. 031301; doi: 10.1063/1.5143815. Jul. 9, 2020. pp. 1-34.

List of IBM Patents or Patent Applications Treated as Related dated Apr. 6, 2021, 2 pages.

\* cited by examiner

WEIGHT SHIFTING FOR NEUROMORPHIC SYNAPSE ARRAY

BACKGROUND

Technical Field

The present invention relates to a scheme and its implementation for weigh shifting for a neuromorphic synapse array with a single polarity weight per cell. Specifically, the scheme will be realized with a neuromorphic synapse array, a neuromorphic core, a multi-neuromorphic core (neuromorphic chip or system), and a neuromorphic processor.

Description of the Related Art

Non-volatile memory (NVM) based neuromorphic synapse array and chip are emerging. The NVM based neuromorphic chips are hardware implemented neural network computing such as SNN (Spike neural network) and DNN (Deep neural network). Updates of weights and activation potential are especially needed to practice a McCulloch-Pitts neuron model during learning phases in the NVM-based neuromorphic chips. The neuromorphic synaptic array generates input data dependent on updated weights of all the cell array to transfer the input data to subsequent synaptic neurons.

SUMMARY

According to a first aspect of the present invention, a neuromorphic synapse array is provided. The array cells are connected by circuitry such that the synaptic array cells are assigned to rows and columns. The neuromorphic synapse array includes a plurality of synaptic array cells, a plurality of operation column arrays, and a reference column array. The synaptic array cells respectively have a single polarity synapse weight. The rows respectively connect to respective input ends of the synaptic array cells. The columns respectively connect to respective output ends of the synaptic array cells. Moreover, the synaptic array cells are classified into operation synapse cells and reference synapse cells for shifting a product-sum of the operation synapse cells. The operation column arrays are defined by the operation synapse cells aligned in a column of the array. The reference column array is defined by the reference synapse cells aligned in a column of the array. Each cell of the reference column array connects to the corresponding row of the array configured such that weights of all of the reference synapse cells are set to the average weights of all of the operation synapse cells that are updated during a learning phase. Specifically, in an accurate embodiment, each weight of reference synapse cells is set to an average weight of all the operation synapse cells to receive the same input data aligned in the same row as the reference synapse cells.

According to a second aspect of the present invention, the neuromorphic synapse array of the aforementioned aspect is provided. Specifically, each weight of the reference synapse cells is set to an average weight of all the operation synapse cells to receive the same signal aligned in the same row as the reference synapse cells.

According to a third aspect of the present invention, a neuromorphic core including the aforementioned neuromorphic synapse array as well as activation function circuits is provided. Each of the activation function circuits is respectively connected to the output ends of the operation column arrays. Specifically, the activation function circuits receive the shifted product-sums to generate activated signals of the neuromorphic core.

According to a fourth aspect of the present invention, the neuromorphic cores further including one or more aforementioned neuromorphic cores are provided. For example, both the neuromorphic cores are configured such that the post-synaptic neurons of the first neuromorphic core are connected in a one-to-one manner to pre-synaptic neurons of the second neuromorphic core. Specifically, the cores can receive input data at the pre-synaptic neurons of the first neuromorphic core and generate the activated signals at the post-synaptic neurons of the second core.

According to a fifth aspect of the present invention, the neuromorphic synapse array of the second aspect further including control-circuits for shifting its product-sum output after receiving signals from the input ends is provided. Specifically, control-circuits update a synapse weight for operation synapse cells according to the learning rules, calculate average weights of all of the operation synapse cells to receive same input aligned in the same row as the reference synapse cells, update the weights of the reference synapse cells with the calculated weights, check whether learning has been completed or not, and shift product-sum values of the operation column arrays by subtracting a product-sum value of reference column array from all of the product-sum values of operation column arrays.

According to a seventh aspect of the present invention, a neuromorphic processor including the neuromorphic core and a controller for shifting synaptic weights in the neuromorphic cores is provided. A controller is connected to the neuromorphic core and is configured to transfer input data and output data through the pre-synaptic neurons and the post-synaptic neurons of the neuromorphic core. Specifically, the controller updates weights of the operation synapse cells, calculates average weights of all the operation synapse cells to receive the same input aligned in the same row as the reference synapse cells, updates the weights of the reference synapse cells with the calculated weights, checks whether learning has been completed or not, and shifts product-sum values of the operation column arrays by subtracting a product-sum value of a reference column array from all of the product-sum values of the operation column arrays.

The summary clause does not necessarily describe all necessary features of the embodiments of the present invention. The present invention may also be a sub-combination of the features described above.

DETAILED DESCRIPTION

Hereinafter, exemplary embodiments of the present invention will be described in detail with reference to the drawings. It is to be noted that the present invention is not limited to the exemplary embodiments to be given below and may be implemented with various modifications within the scope of the present invention. In addition, the drawings used herein are for purposes of illustration, and do not show actual dimensions.

The following features are embedded in the neuromorphic synapse array to attain the outputs in range close to zero. An input of a neuron activation function needs to be converted to an optimum range (close to zero) by biasing or shifting the output of synapse (product-sum value). Reference synapse cells are prepared in the neuromorphic synapse array. The reference synapse cells receive the same input data as the operation synapse cells. The weights of all reference synapse cells are set to the average value of all operation synapse cells so that the average of the product-sum values can exactly be biased (shifted) to zero. In a more accurate case, the average value may be set to the average weights of all the operation synapse cells aligned in the same row as the reference synapse cell. In this case, all the operation synapse cells in the same row receive the same input as the reference synapse cell. The product-sum value for reference synapse cells is subtracted from the product-sum values for all operation synapse cell columns. The product-sum value for reference synapse cells gives exact average amount of the product-sum values from operation synapse cells. So, the product-sum value for reference synapse cells gives biasing or shifting of the product sum values of the operation synapse cells. The subtraction can be implemented with several circuit manners which are not so complicating to the neuromorphic synapse array.

Figure 1:
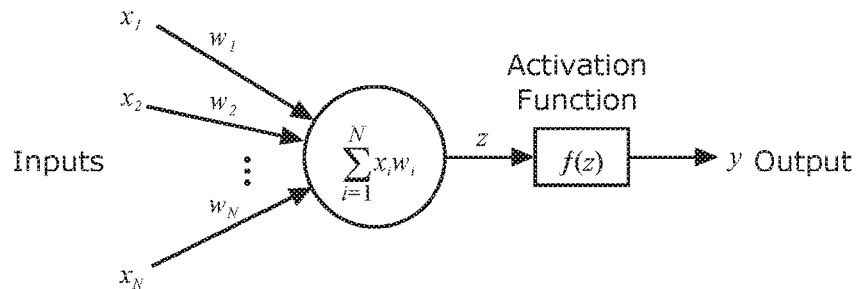
FIG. 1 shows an exemplary neuron excitation through a multiply-accumulate (MAC) operation of inputs from multiple pre-neurons by the synapses of a neuron.

FIG. 1 shows an exemplary neuron excitation through a multiply-accumulate operation (MAC) of inputs from multiple pre-neurons by the synapses of a neuron. The multiply-accumulate operation (MAC) can be called "the product-sum". The neuromorphic array harnesses the MAC operation of biological neuron activation potential model. Neuron membrane potential, dubbed "neuron action potential" is calculated with the addition of multiplied results (product-sum) of input values and weights of synapses which are connected between the input ports and the neuron.

Figure 2:
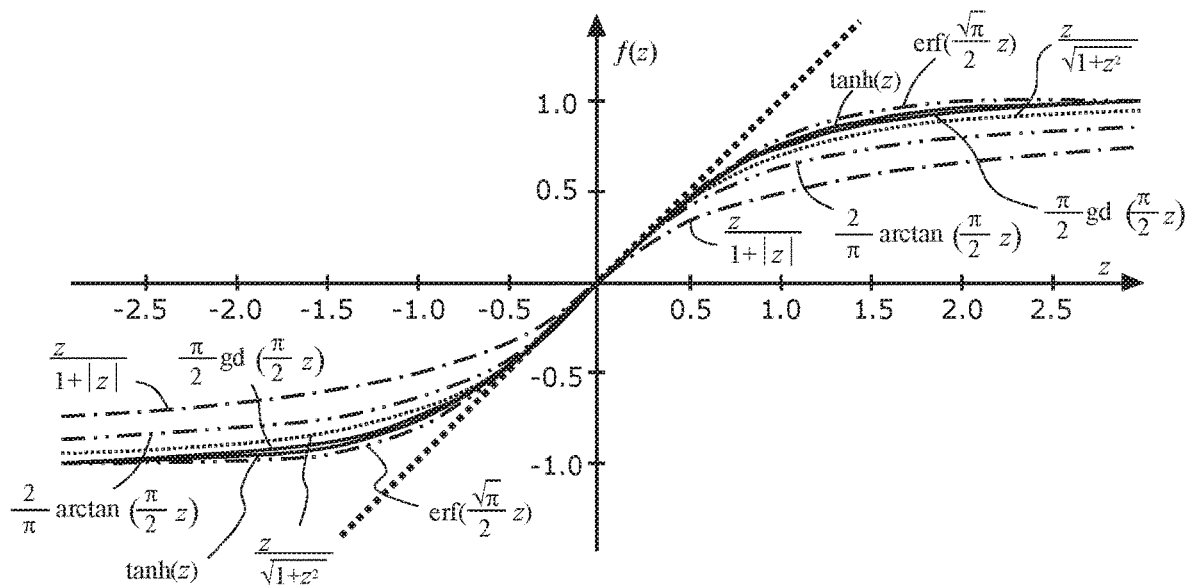
FIG. 2 shows exemplary activation functions in the neuromorphic model.

FIG. 2 shows an exemplary activation functions describing a property of nonlinear curves. Examples of the activation functions other than a sigmoid function are shown. In order to get the optimum performance of the system, the result of the above MAC operation needs to be in the sensitive input area of the activation function which ranges close to zero.

To make the product-sum close to zero, the synapse weight needs to have both positive and negative values. Assignment of negative weights for synapse cells can be implemented easily in a software system. It, however, needs a special structure for parallel operation such as a hardware system.

One synapse weight can be expressed with two devices which hold positive and negative values, respectively. Synapse weight is given by the difference of these two values. This structure uses area for double the number of synapse devices and additional control circuits.

In the neuromorphic chip array implemented with Resistive Processing Unit (RPU) devices, a single device is prepared for one synapse weight while the input data with its average is zero. Data input for a synapse is processed in a time division multiplex for positive value data and negative value data. The input data for negative value data is given as its absolute (positive) value to the synapse. The final product-sum value is given by subtracting the product-sum value for negative input data from that for positive input data. This scheme can take takes twice the time for a calculation of the product-sum operation value and needs additional circuits for storing the product-sum operation value for the positive input data in addition to the subtraction circuit.

The neural network system of crossbar synapses with a single polarity synapse device and with a single polarity input is challenging to implement for enhancing the density of the synapse array. Though the implementation of a single polarity weight per cell can be in a scalable neuromorphic chip, such an implementation, however, may have to avoid a lot of complicated circuits.

Figure 3:
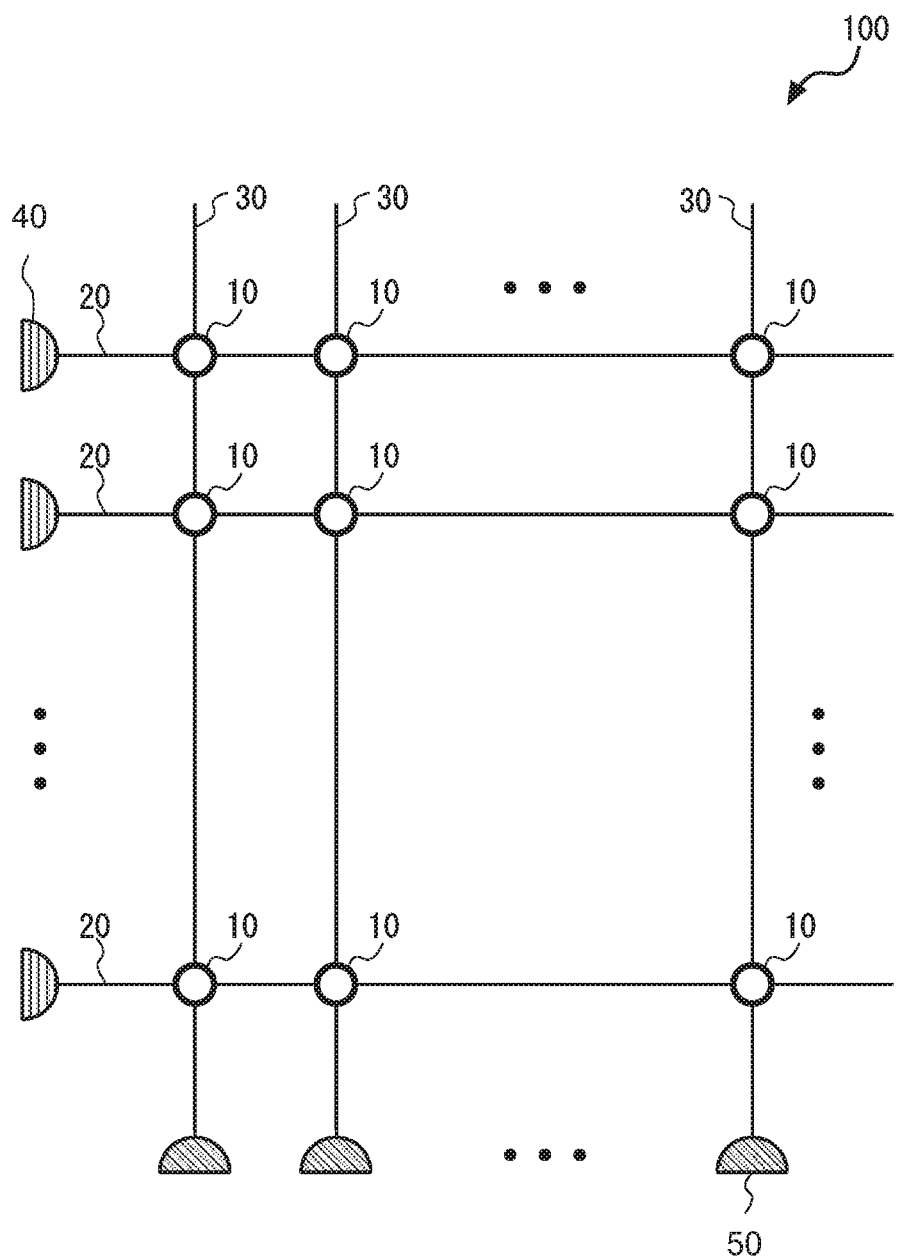
FIG. 3 shows an exemplary overview of a neuromorphic synapse array chip-like neural network with a crossbar array of cells according to an embodiment of the present invention.

FIG. 3 shows an exemplary overview of a neuromorphic synapse array-like neural network with a crossbar array of cells according to an embodiment of the present invention. A neuromorphic synapse array may be referred to as a "synapse array". Referring to the figure, the neuromorphic synapse array 100 may include synapse array 10, or cells of the array which are placed at all of the cross points of all of the rows, or axons 20 and columns, or all of the dendrites 30. A synaptic cell is also referred to as resistive cell or synaptic memory cell such as NVM (nonvolatile memory). Each of the synaptic cells 10 may store a synapse weight value as one example of a synaptic state, which indicates a synaptic connection weight (e.g., the synaptic weight) between one of the axons 20 and one of the dendrites 30. Each of synaptic cells 10 may include two kinds of memory cells which enable to record an analog data as well as a digital data.

All axons 20 connect to pre-synaptic neurons 40 at one respective end of each of the axons. All dendrites 30 connect to post-synaptic neurons 50 at one respective end of each of the dendrites. Each one of such ends may be referred to as an input end and an output end respectively. Each of the input ends and output ends, however, are utilized to transfer signals of not only in a single direction, but also in both directions. Then, each of the pre-synaptic neurons 40 passes input data to the corresponding synaptic cells 10 through the axons 20. Each of the post-synaptic neurons 50 receives output data from corresponding synaptic cells 10 through the dendrites 30. The activation-function-simulated-circuits may be embedded into the output side (or input side) of the neuromorphic synapse array core 100 also referred to as a current synaptic neuron. The circuits may be implemented in the boundary between the current synaptic neuron 100 and the post-synaptic neurons. All columns 30 may connect to post-synaptic neurons 50 through the activation-function-simulated-circuits (not shown). Also, the circuits may be included in the post-synaptic neurons. The neuromorphic array enables interfacing with the post-synaptic neurons downstream and with the pre-synaptic neurons upstream. The pre-synaptic neurons and the post-synaptic neurons are implemented for handling input data from upstream and output data downstream. The pre-synaptic neurons may include I/O drivers having DAC (digital to analog converter). The post-synaptic neurons may include I/O drivers having ADC (analog to digital converter). Embedded is one of the activation functions, the pre-synaptic neurons, and the post synaptic neurons in the neuromorphic synapse array to compose a "neuromorphic core". When the neuromorphic synapse array 100 includes one of them, it can be referred to as a "neuromorphic core". Moreover, plural neuromorphic cores may aggregate multi-neuromorphic cores called "a neuromorphic chip or system" by connecting a post-synaptic neuron of one core and a pre-synaptic neuron of another core. Furthermore, a "neuromorphic processor" called an AI controller like an AI speaker is manufactured by utilizing the "neuromorphic core". The neuromorphic or system processor may include not only the core, but also a controller handing a database including training data, and a comparing section. The inputs like training data may be included in the database recorded in storage apparatuses.

The NVM based neuromorphic array 100 represents one possibility for implementing massively-parallel and highly energy-efficient neuromorphic computing systems. Especially some advances are reported in the NVM based implementation to two computing paradigms such as spiking neural network (SNN) and deep neural network (DNN). In SNN, NVM-based synaptic connections are updated by a local learning rule such as spike-timing-dependent-plasticity (STDP) to practice a computational approach directly inspired by biology. For DNN, NVM-based arrays can also represent matrices of synaptic weights, implementing the multiply-accumulate (MAC), or the product-sum operation needed for algorithms such as backpropagation in an analog yet massively-parallel fashion.

The crossbar array 100 is applicable to various kinds of implementations such as not only to SNN and DNN, but also to Dynamic Boltzmann Machine, Contrastive Divergence, and Gradient Descent. The synaptic cells 10 corresponding to one of the pre-synaptic neurons is connected to each of the post-synaptic neurons via each of the synaptic cells respectively having a unique conductance value. The system may include not only the crossbar synaptic array, but also a controller handling a database including training data, and a comparing section. The training data may be included in the database recorded in one or more storage apparatuses.

Figure 4B:
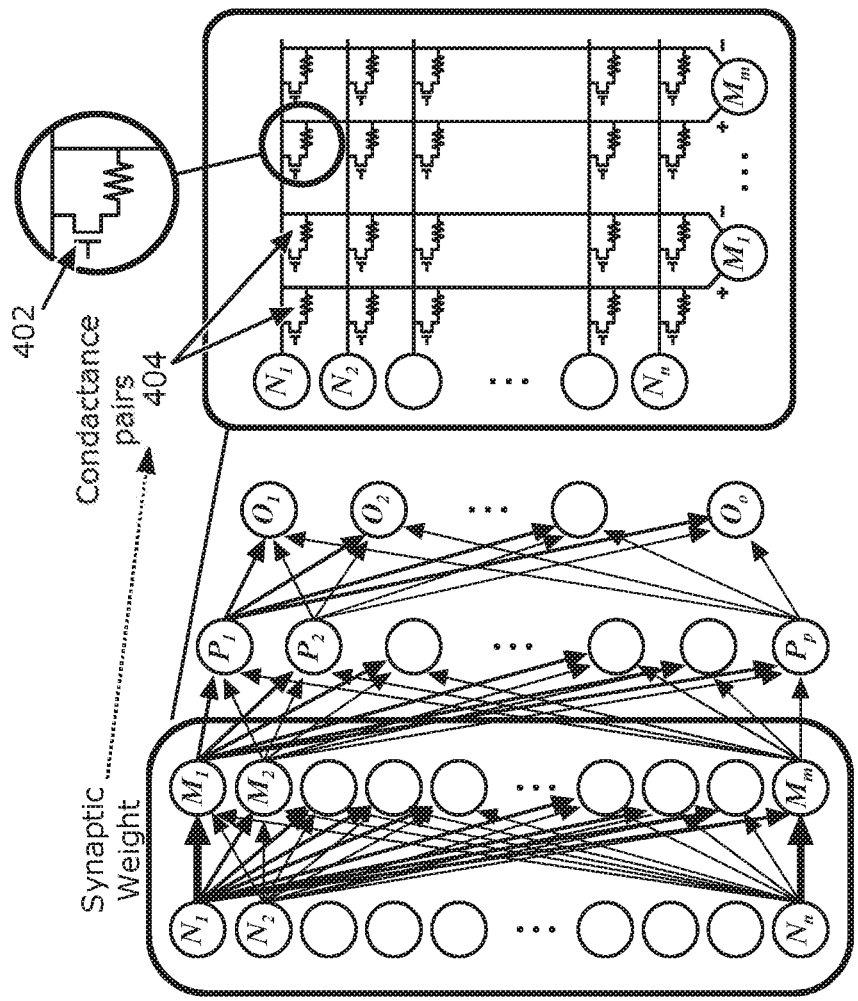
FIG. 4B shows an exemplary hardware implementation of Deep Neural Networks according to an embodiment of the present invention.
Figure 4A:
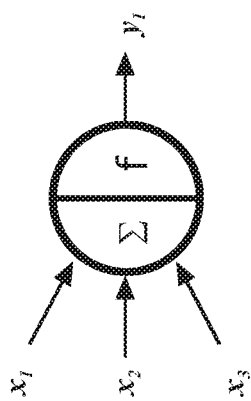
FIG. 4A shows an exemplary downstream neuron excitation through a multiply-accumulate operation of an embodiment of the present invention.

FIG. 4A shows an exemplary downstream neuron excitation through a multiply-accumulate (MAC) operation according to an embodiment of the present invention. In FIG. 4A as well in FIG. 1, a characteristic is a downstream neuron excitation of DNN from the pre-synaptic neurons. The downstream neuron excitation depends on the weight excitation of all upstream neurons, evaluated through the MAC operation. Input data $x_1, x_2, x_3, \ldots, x_n$ from multiple pre-synaptic neurons are accumulated to a current neuron. The MAC operation is that each of the synapses multiplies the input data by each weight, then the current neuron accumulates (i.e., $\Sigma$) the weighted input data $x_i w_i$ from each of the pre-synaptic neurons to the product-sum z. The product-sum z stimulates the excitatory and inhibitory potentials referred to as an activation functions f(z) to generate an output data y.

FIG. 4B shows an exemplary hardware implementations of Deep Neural Networks (DNNs) according to an embodiment of the present invention. Each of the post-synaptic neurons ($M_1, M_2, \ldots, M_m$) receives output data weighted through the synaptic cells from the pre-synaptic neurons ($N_1, N_2, \ldots, N_n$). Then, the weighted output data, as input data, are supplied to a subsequent neuron ($P_1, P_2, \ldots, P_p$) layer. In FIG. 4B, the MAC operation featured in both a forward-inference and backpropagation of DNNs, can be implemented as vector-matrix multiplication on a large NVM based array. The crossbar array of synaptic cells with NVM (conductance) and transistor 402 pairs 404 is ideally suited for the MAC operations at the heart of a DNN. The multiply operation is performed at every crossbar by Ohm's law, with current summation along rows or columns performed by Kirchhoff's current law.

Figure 5:
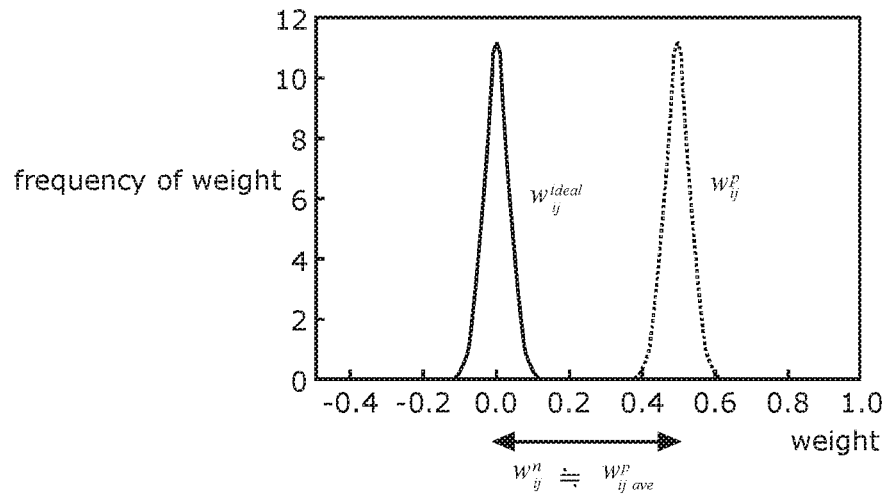
FIG. 5 shows frequency distribution of weight according to the concept of weight biasing or shifting according to an embodiment of the present invention.
Figure 8:
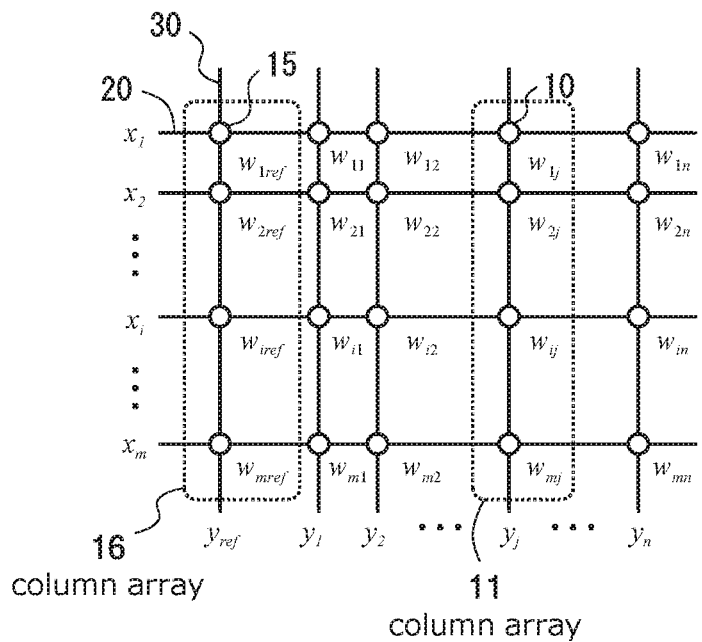
FIG. 8 shows a concept of synapse array with an additional synapse array according to an embodiment of the present invention.
Figure 10:
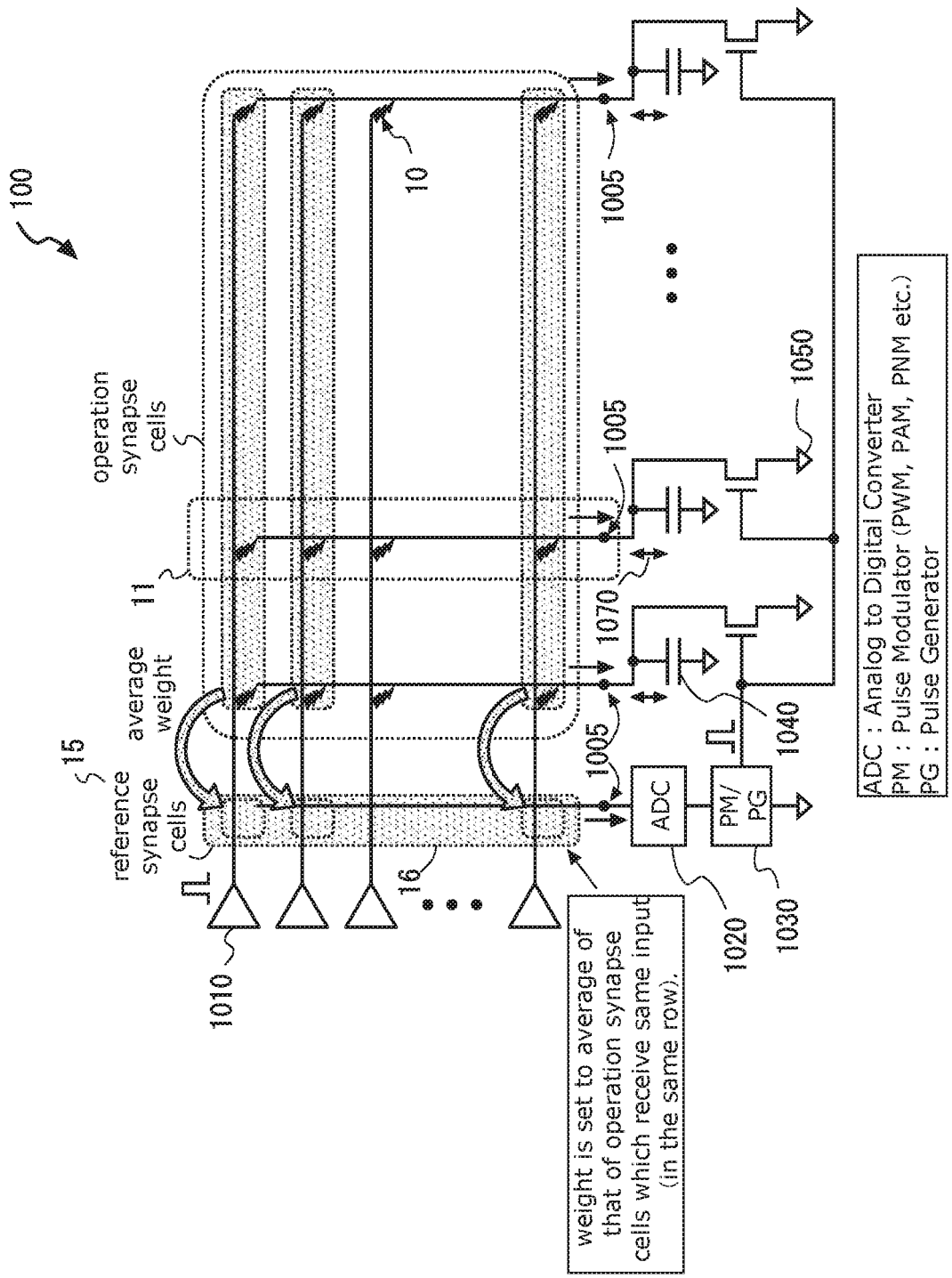
FIG. 10 shows an exemplary circuit of a neuromorphic synapse array implemented with a pulse modulator (PM) according to an embodiment of the present invention.

FIG. 5 shows a frequency distribution of weight according to the concept of weight biasing or shifting in accordance with an embodiment of the present invention. In FIG. 5, there is an ideal weight $w_{ij}^{ideal}$ per cell of an existing array compared to a single positive NVM polarity weight of the present invention. The single polarity weight can be expressed with negative value of the NVM as well. In an existing neuromorphic synapse array, the ideal weight $w_{ij}$ per cell may be expressed with two polarity weight values as follows: $w_{ij}^{ideal} = w_{ij}^P - w_{ij}^n$. The ideal weight $w_{ij}^{ideal}$ per cell attains a value close to zero with the difference between a positive value and a negative value of the NVM's. The implementations of the NVM-neuromorphic array are difficult to achieve with a single polarity device implemented weight per cell. The invention makes use of the concept of a term "$w_{ij}^n \approx w_{ij}^P{}_{ave}$" denoted along a lateral axis weight to get close to $w_{ij}^{ideal}$. In the concept, $w_{ij}^P{}_{ave}$ is utilized so that all the operation synapse array (defined later) should be shifted close to $w_{ij}^{ideal}$. To realize this concept, additional circuits are embedded into the neuromorphic seaplanes array. In FIG. 8, FIG. 10, and, FIG. 11, the additional cells called "reference synapse cells" will be detailed, which take account of $w_{ij}^P{}_{ave}$ dependent on a single polarity cell-based array.

Figure 6:
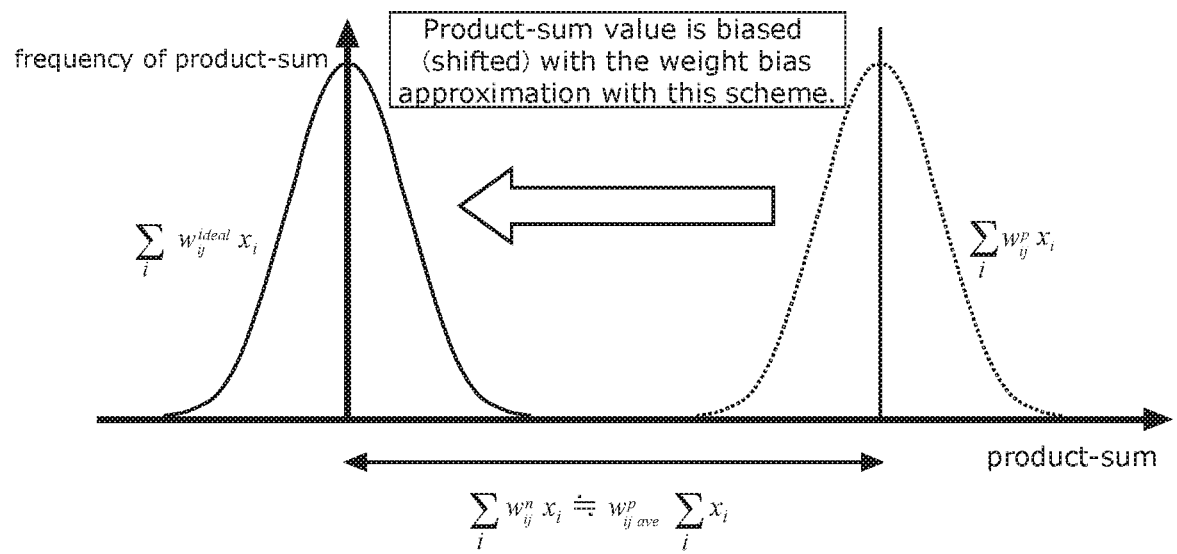
FIG. 6 shows a frequency distribution of input and weight product-sum according to an embodiment of the present invention.

FIG. 6 shows a frequency distribution of input and weight product-sum according to an embodiment of the present invention. In FIG. 6, the product-sum value is shifted with the weight bias approximation of the invention. Referring to FIG. 5 and FIG. 6, the concept of weight shifting will be explained. The neural network system with crossbar synapse memory cells is realized with a single polarity synapse weight by utilizing the concept. Index i denotes rows, or axon lines 20 of the neuromorphic synapse array. Index j denotes columns, or dendrite lines 30 of the neuromorphic synapse array. $y_j$ represents outputs of column j through multiple neuromorphic synapses where the product-sum of inputs and weights are performed. The outputs of the column j are expressed with the product-sum of multiplying input and weight as below:

$$y_j = \Sigma_i w_{ij}^{ideal} x_i = \Sigma_i (w_{ij}^p - w_{ij}^n) x_i = \Sigma_i w_{ij}^p x_i - \Sigma_i w_{ij}^n x_i \quad \text{(equ-1)}$$

If $\Sigma_i w_{ij}^n x_i$ can be approximated as $\Sigma_i w_{bias} x_i$ with a constant value of $w_{bias}$, that is, $y_j \cong \Sigma_i (w_{ij}^p - w_{bias}) x_i = \Sigma_i w_{ij}^p x_i - w_{bias} \Sigma_i x_i$ (equ-2) then, the average of ideal distribution of $w_{ij}$ is zero. So, the $w_{bias}$ can be approximated with the average value of $w_{ij}^p (w_{ij\ ave}^p)$ $y_j \cong \Sigma_i (w_{ij}^p - w_{ij\ ave}^p) x_i = \Sigma_i w_{ij}^p x_i - w_{ij_{ave}} \Sigma_i x_i$ (equ-3). As shown FIG. 12, with the above scheme, a neuromorphic array with single polarity weight cell enables the outputs 1220,1240 to reach as close as possible to the ideal output $y_i = \Sigma_i w_{ij}^{ideal} x_i$ (equ-4) (1260).

The first embodiment is provided, in which a term $\Sigma_i w_{ij}^n x_i$, of the equation (equ-1) is approximately substituted with constant value $w_{bias}$. As mentioned later in FIG. 12, the result 1220 of the first embodiment shows that the weight biasing scheme can be approximated with an average value of positive weights when calculating a product-sum value of input and weight. In the first embodiment, the NVM can be simply implemented with single polarity synapse polarity weight. In the case of the first embodiment $\Sigma_i w_{ij} x_i$ takes advantage of a simple implementation by assigning the constant value 1220 of the average of all the synapse cells to the reference cells as additional hardware elements. There is a certain amount of error in this scheme comparing to an ideal neuromorphic synapse array implemented with commentary weights per cell. A more accurate embodiment (1240 of FIG. 12) will be provided with this scheme adapted on additional "reference column array 16" in FIG. 8.

Figure 7:
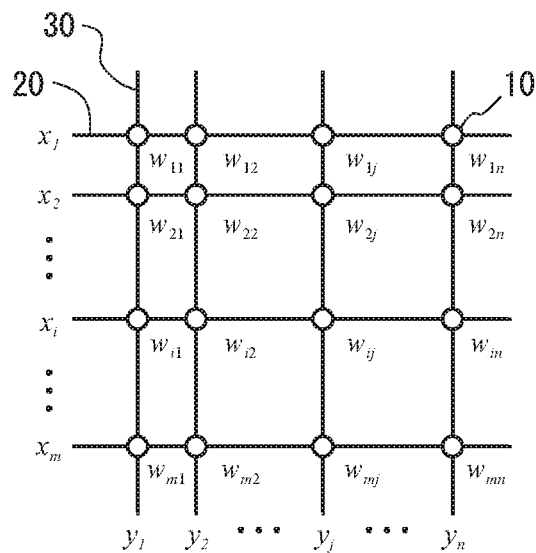
FIG. 7 shows an exemplary neuromorphic synapse array and a product-sum operation in a neural network array with crossbar arrays of cells according to an embodiment of the present invention.

FIG. 7 shows an exemplary concept of a neuromorphic synapse array 100 and the product-sum operation in neural network array with crossbar arrays of cells 10 in accordance with an embodiment of the present invention. With the synapse cell array 100 in the FIG. 8, the average product-sum value of column array $y_j$ (j=1 to n) denoted as $y_{ave}$ is calculated as follows:

$$y_{ave} = \frac{1}{n} \sum_{j=1}^{n} yj = \frac{1}{n} \sum_{j=1}^{n} \sum_{i=1}^{m} w_{ij} x_i = \quad \text{(equ-5)}$$

$$\frac{1}{n} \sum_{i=1}^{m} \sum_{j=1}^{n} w_{ij} x_i = \sum_{i=1}^{m} \left( \frac{1}{n} \sum_{j=1}^{n} w_{ij} \right) x_i = \sum_{i=1}^{m} w_{iave} x_i$$

where $$w_{iave} = \frac{1}{n} \sum_{j=1}^{n} w_{ij}$$

(i=1 to m) is the average weight value of the synapses in the i-th row. In the invention's scheme, an additional column cell array may be referred as a "reference synapse cells" 15 (FIG. 8) for setting the average weights of all operation synapse cells 10, aligned in the same row lines. The reference synapse cells 15 generate output $y_{ref}$, or the product-sum value of $y_j$ like the operation synapse cells 10 as shown in the following figure.

FIG. 8 shows a concept of the synapse array with additional array cells according to an embodiment of the present invention. Additional array cells, called "reference synapse cells" 15 are prepared, which are different from existing synapse cells, called operation synapse cells 10. The kind of the reference synapse cell may be the same as the operation synapse cell for the ease of manufacture. The operation synapse cells 10 aligned in a column define a lot of operation column arrays 11. Each of the operation column arrays supplies the product-sums $y_j$ (j=1 . . . n) as an output. The reference synapse cells 15 constitute a reference column array 16. The reference column array supplies the product-sum $y_{ref}$ as an output, which is subtracted from the product-sums $y_j$ (j=1 . . . n) of the operation column arrays. The neuromorphic synapse array of the present invention includes a reference column array 16 constituted with the reference synapse cells embedded into the input side of the operation column array 11. Positioning of the reference column array 16 isn't limited to the location of shown in FIG. 8. Wherever the reference column array 16 is embedded into the column arrays 11, the scheme of embodiments is allowed to implement synapse array structure.

Figure 12:
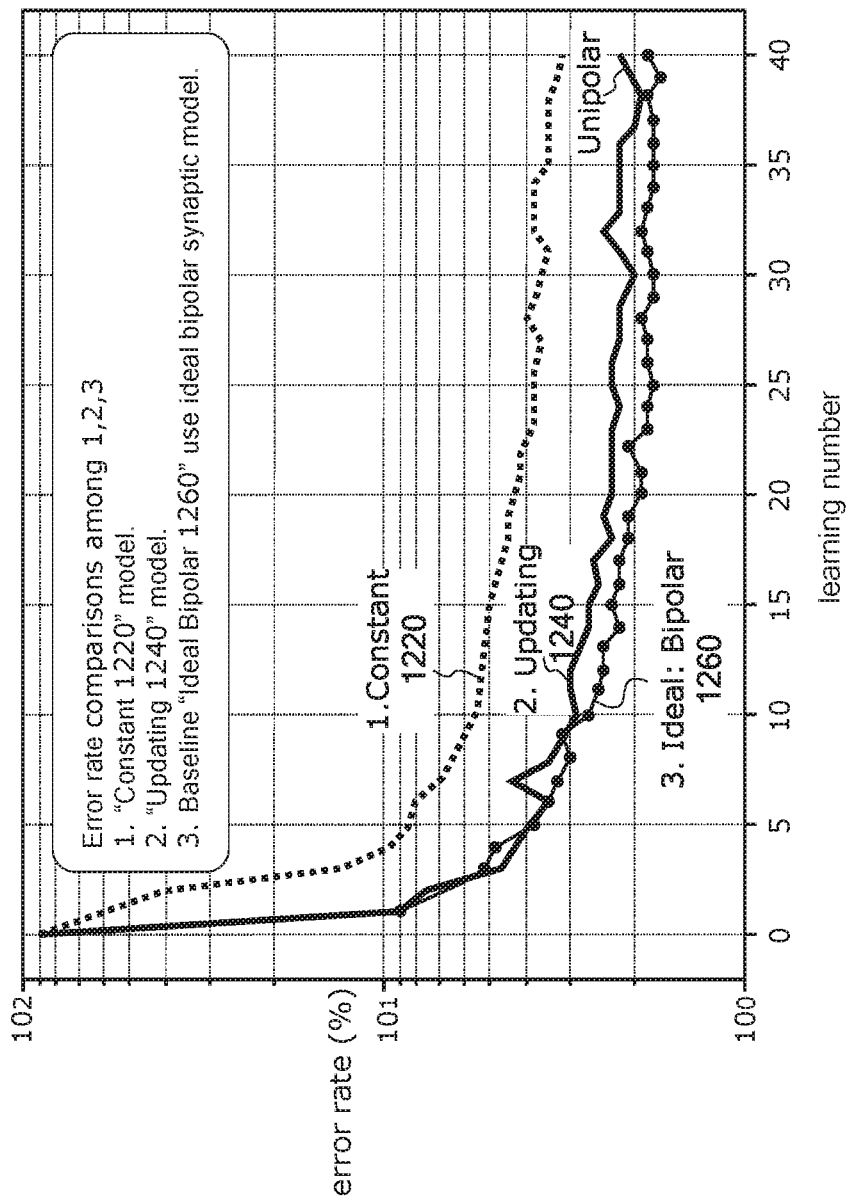
FIG. 12 shows an exemplary result of a single synaptic weight model according to an embodiment of the present invention.

A second embodiment is provided with more accurate result (1240) using the reference column array 16 as shown in FIG. 12. The second embodiment also makes use of the product-sum values, or output $y_{ref}$ from the reference column array 16. The $w_{i\ ref}$ and $y_{ref}$ can be expressed as follows:

$$w_{iref} = w_{iave} \left( = \frac{1}{n} \sum_{j=1}^{n} w_{ij} \right) \ (i = 1 \text{ to } m), \ y_{ref} = y_{ave}. \quad \text{(equ-6)}$$

This scheme makes the average of $y_j$ (j=1 to n) much close to zero by subtracting $y_{ref}$ from each $y_i$ (j=1 to n). The second embodiment describes that the average weight of the synapse cells aligned in a row is respectively assigned to each of the reference cells to be the same as that of the corresponding rows of the operation synapse cells. The weights of all reference synapse cells are set to the average value of all the operation synapse cells which receive the same input aligned in the same row. As mentioned later referring to FIG. 0.12, seeing line 1240, the average of the product-sum values can be exactly shifted close to ideal case 1260 rather than to the first embodiment of the constant assigned case 1260. The difference of accuracy means that input data are respectively supplied to each of rows in different timing. Therefore, the latter embodiments bring about a more accurate learning phase than the first one.

Figure 9:
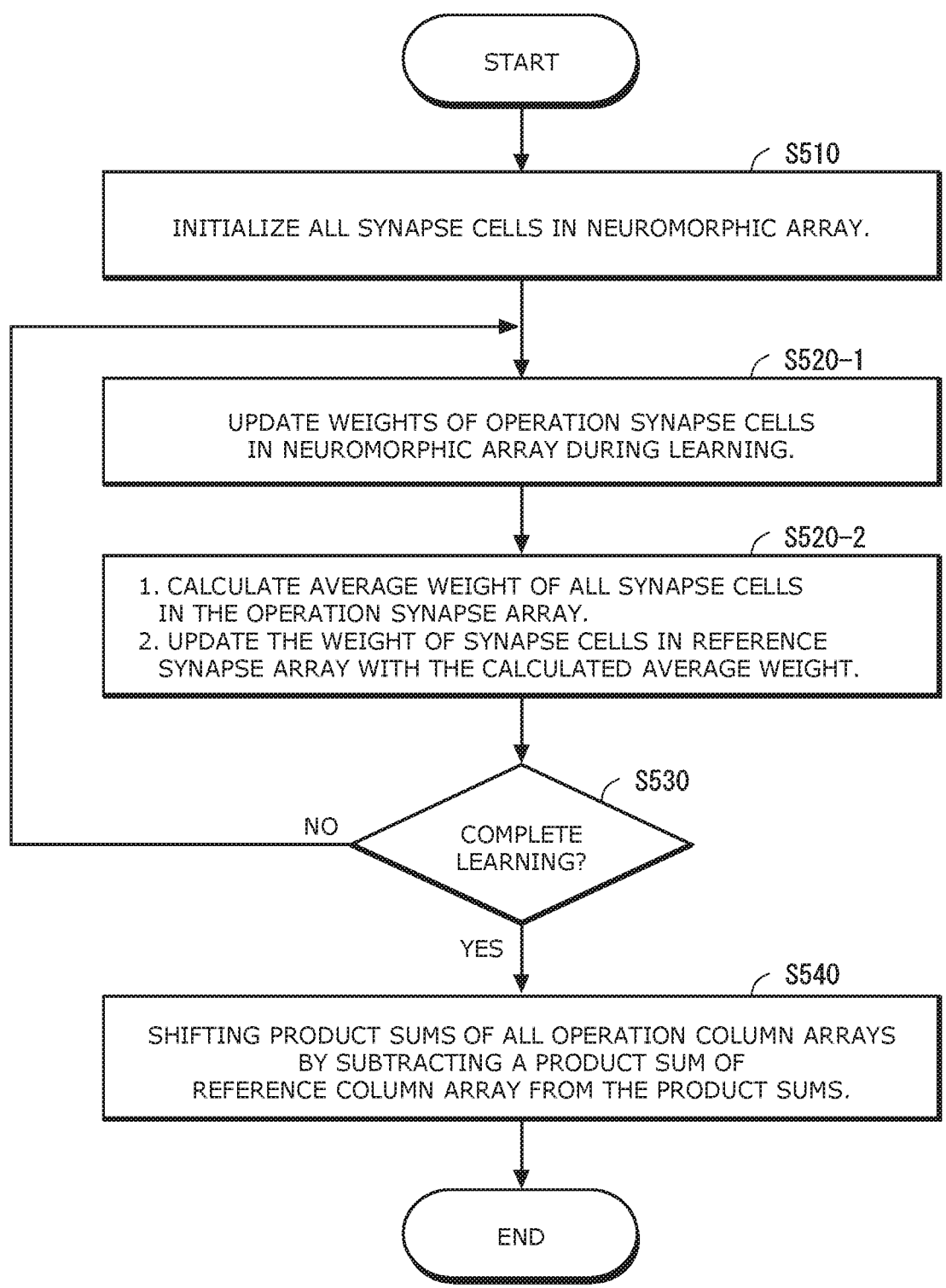
FIG. 9 shows an exemplary operational flow of the neuromorphic array or chip according to an embodiment of the present invention.

FIG. 9 shows an exemplary operational flow of the neuromorphic array 100 or chip according to an embodiment of the present invention. At the first stage of driving the chip, a procedure of S510 executes initializing all synaptic cells in the crossbar array 100 before the learning operation. The controller 1300 (FIG. 13) may initialize not only the operation synapse cells 10, but also the reference synapse cells. Instead, firmware and ASIC embedded into the neuromorphic chip, may execute the flow including the initiation procedure. In the initialization, weights of the operation synapse cells may be set to randomized values.

The procedures from S520-1 to S540 include features of shifting outputs, or the product-sums of the operation column arrays along with or after updating weights of the operation synapse cells during learning phase. At S520-1, weights of the operation synapse cells are updated during learning phase. Specifically, weights of all the operation synapse cells 10 are updated by the difference between outputs and expected data during receiving inputs such as MNIST (Modified National Institute of Standards and Technology) benchmark data. The weights are updated in the operation synapse cells whether the neuromorphic synapse array works as the backpropagation learning rule in DNN or the STDP local learning rule in SNN. The neuromorphic synapse array may include a control unit for performing the procedures from S520-1 to S540. For example, field-programmable gate arrays (FPGA) circuits may be embedded in the neuromorphic synapse array. Also, a controller 1300 unit may be substituted with computer system outside the neuromorphic synapse array.

A procedure of S520-2 includes two steps. An initial step is to calculate the average weighs of all the operation synapse cells. A next step is to update the weight of the reference synapse cells with the calculated average value. The procedure is performed every time after weights of the operation synapse cells are updated. The procedure follows the learning phase in which weights of the operation synapse cells are updated.

A more precise embodiment is given at the procedure of S520-2. The initial step of the procedure S520-2 may calculate average weights of all the operation synapse cells to receive the same input aligned in the same row as the reference synapse cells. At the next step, each weight of reference synapse cells is updated with the average weights of all the operation synapse cells aligned in the same row as the reference synapse cells.

A procedure of S530 verifies if the learning phase is completed or not to identify a inferring phase. A procedure of S540 performs a subtraction of the product-sum of the reference column array 16 from the original product-sums of all the column arrays. The subtracting procedure may continue to shift the product-sums of all the operation of column arrays after updating the weights at S520-1 whether the learning phase continues or not. Even during learning, especially, the procedure needs to be performed to update weight values of the operating synapse cells based on the outputs shifted by the procedures of S540. The procedure follows after completing the learning phase at S530 whether learning is in a batch mode or one-by-one. The procedure of S540 is performed to infer new input data with shifted product-sums of operation column arrays after the learning. The procedure results in shifting the product-sums of all the operation of column arrays 11 as output. The procedure may be performed after the weight update of the procedure 520-1 whether the learning phase is in a batch mode or one-by-one mode.

Both procedures of S520-2 and S540 are for preparing the reference synapse cells whose output is biased to outputs of operation synapse cells with single polarity weights. Concretely, the product-sum of the reference column array is subtracted from the product-sums of all the operation column arrays to shift outputs of the neuromorphic synapse array. Both steps are such that the outputs, so called the product-sums of the operation synapse cells, should result in a value close zero.

It is practical that neuromorphic chip dynamically moves the product-sum values around the range of zero so to harness nonlinearities caused by activation functions (See FIG. 2). Subtracting procedures of S520-3 from the outputs of the operation columns results in the outputs close to the range of zero. According to cognitive resolution requirements of the applications, the neuromorphic chips may adjust the output of the reference column array to match target cognitive level during the inferring phase. The controller may designate some dynamical range in how the product-sum of the operation column arrays should be dynamically moved within some extent around zero.

FIG. 10 shows an exemplary circuit of neuromorphic synapse array implemented with a pulse modulator (PM) according to an embodiment of the present invention. The output, or analog signals of the reference column array 16 is converted to a digital signal through ADC (Analog-Digital Converter) 1020. Each of the output ends 1005 of the operation column arrays 11 are split into two lines. Each line out of the split lines is connected to a capacitor 1040 to generate potential outputs 1070. Each of the lines passes down the output 1070 to the activation function (FIG. 1) outside the array 100. Activation-function-simulated-circuits may be embedded with the neuromorphic array to compose a neuromorphic core. The activation functions generate outputs of the neuromorphic core as inputs of subsequent neuromorphic cores. Another line of each of the outputs is used to subtract an equivalent amount of the output of the reference column array from all the outputs of the operation column arrays. Another line includes a transistor connected to a ground 1050. The transistor is switched by the digital signal dependent on the output or an analog current of the reference column array to pull the equivalent current to the ground. The PM or the pulse generator (PG) generates a pulse signal from the digital signal through the ADC in Pulse Width Modulate (PWM), Pulse Amplitude Modulate (PAM), and Pulse Number Modulate (PNM) schemes. The pulse signal is applied to a transistor at the output ends of the operation column arrays. A current equivalent to the output of the reference column array 16 is subtracted from the output current of all of the operation synapse column arrays 11 to attain the potential output close to zero. As a result, capacitors 1040 accumulate a current charge of the operation column arrays at output ends 1070 to convert all the outputs of the operation column arrays into a voltage potential. The neuromorphic synapse array 100 supplies the voltage potential to the activation function circuits outside of the array.

Figure 11:
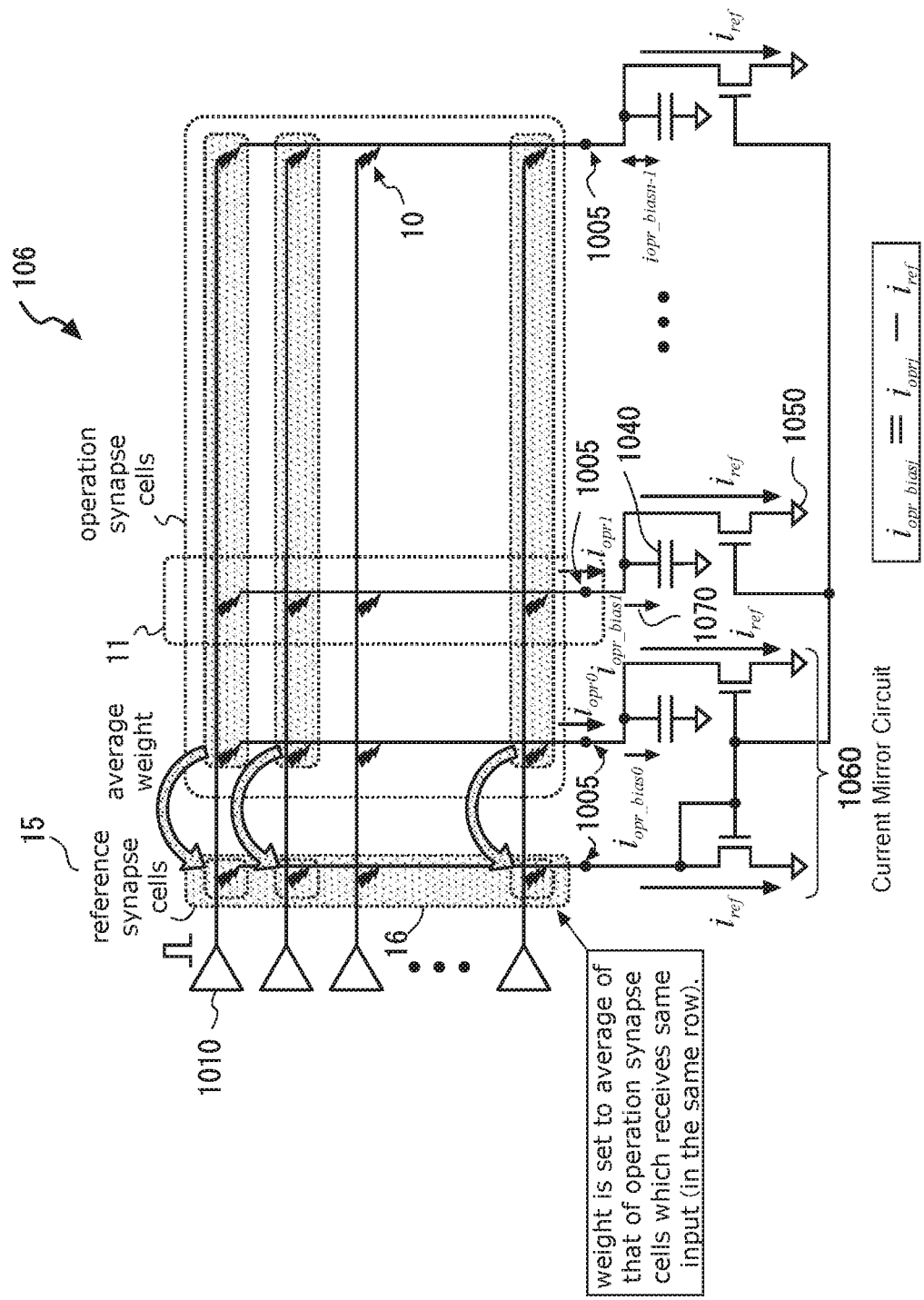
FIG. 11 shows another exemplary circuit of a neuromorphic synapse array implemented with current mirror circuits according to an embodiment of the present invention.

FIG. 11 shows another exemplary circuit of neuromorphic synapse array implemented with current mirror circuits according to an embodiment of the present invention. Like those of FIG. 10, output ends of all the operation column arrays 11 are split into two lines. A lot of the current mirror circuits 1060 are built between an output end 1005 of the reference column array 16 and each of the output ends 1005 of the operation column arrays 11. The transistor on the output end 1005 of the reference column array is respectively paired with the transistor on another line at the output ends 1005 of the column arrays to build a lot of current mirror circuits 1060. As outputs, or the product-sums of the operation column arrays, the currents "$I_{opr,j}$ (j=0, 1, . . . , n−1)" are supplied at the output ends. Each of the lines of all of the operation column arrays is connected to a capacitor 1040 to generate potential outputs 1070 "$I_{opr\_bias,j}$". Each of the lines among the two lines passes down the output 1070 "$I_{opr\_bias,j}$" to the activation potential function-simulated function outside of the array 100. Finally, as shown in FIG. 1, the activation functions generate outputs "y" of the neurotrophic synapse core for inputs of subsequent monomorphic cores including the array. Each of the other lines of the outputs 1070 "$I_{opr\_bias,j}$" is used to subtract a current equivalent to the mirror current of the output "$I_{ref}$" of the reference column array from all the outputs, analog signals "$I_{opr,j}$" (j=0, 1, . . . , n−1) of the operation column arrays. Another line includes a transistor connected to a ground 1050. The transistor, as one element of the current mirror circuit 1060 is switched by interlocking with the output "$I_{ref}$" of the reference column array to pull the current to the ground 1050. As seen in formula below, the product-sum values 1070 "$I_{opr\_bias,j}$" of all of the operation column arrays is shifted by subtracting the output "$I_{ref}$" of the reference column array from the product-sums, or the currents "$I_{opr,j}$": $i_{opr\_bias} = i_{opr,j} - i_{ref}$. Thus, it turns out that the product-sum values of all the operation column arrays is shifted to enable to make the product-sum values of the neuromorphic arrays close to zero.

FIG. 12 shows an exemplary result of a single synaptic weight model according to an embodiment of the present invention. There are comparisons of simulation results among three cases of a bipolar, unipolar, and constant synaptic weight model, which are conducted using MNIST benchmark data. The result shows that error rates of MNIST are reduced as compared with the case of assigning the average of initial weights to the reference synapse cells before learning phase. As in the first case of embodiments explained in FIG. 6, the dotted curve 1220 is a "Constant" model which never change weight value $w_{i,ref}$ of the reference synapse cell 15 during training. Usually, weights $w_{ij}$ of the operation synapse cells 10 are randomized at an initialization procedure S510 (FIG. 10). Then, the reference synapse cells 15 is set to an average $w_{ave,j}$ of all of the operation synapse cells. As explained for the second embodiment in FIG. 8, a more accurate case shows that line graph line 1240 is an "Updating" model of an accurate embodiment which is proposed. The weights of all of the reference synapse cells are set to the average value of all the operation synapse cells which receive the same input aligned in the same row. Point line 1260 indicates an ideal bipolar synaptic model as an ideal case in which one synaptic cell is implemented with positive and negative polarity weights. There is provided an ideal bipolar synaptic model, which makes the product-sum values close to zero. A more accurate model 1240 of the proposed embodiments is approximately 1% less than that of "Constant" model 1220 and approximately 0.2% larger than that of ideal model 1260.

MNIST supplies the input training data pattern fed to an input end of the neuromorphic chip according to the present embodiment. The training data are supplied to the input ends. With the operation flow shown in FIG. 9, the neuron potential of each synaptic cell 10 may be monitored. The MNIST input data pattern of the action potential are fed to the input ends via pre-synaptic neurons in the learning operation. The character image pattern of MNIST, as the input data, may be fed through the pre-synaptic neurons, however the input data pattern can be formatted, either with a dot (e.g., 28×28 pixels) scheme for DNN or with a time-series scheme for SNN. The input data is limited to not only static digitized data of handwritten digits (e.g., MNIST), but can also include a time-series data sequence in which plural pieces of data are arranged such as audio data, video data, and the like. In DNN, the learning operation is performed with backpropagation on the database of handwritten digits or pixel dotted character. The neuromorphic synapse array can keep its activation function in ranges close to zero, ensuring that a neuron model as such McCulloch-Pitts, depicted in FIG. 1, is dependent on nonlinearity. Also, the neuromorphic synapse facilitates implementing scalable control circuit for synapse cell array.

Figure 13:
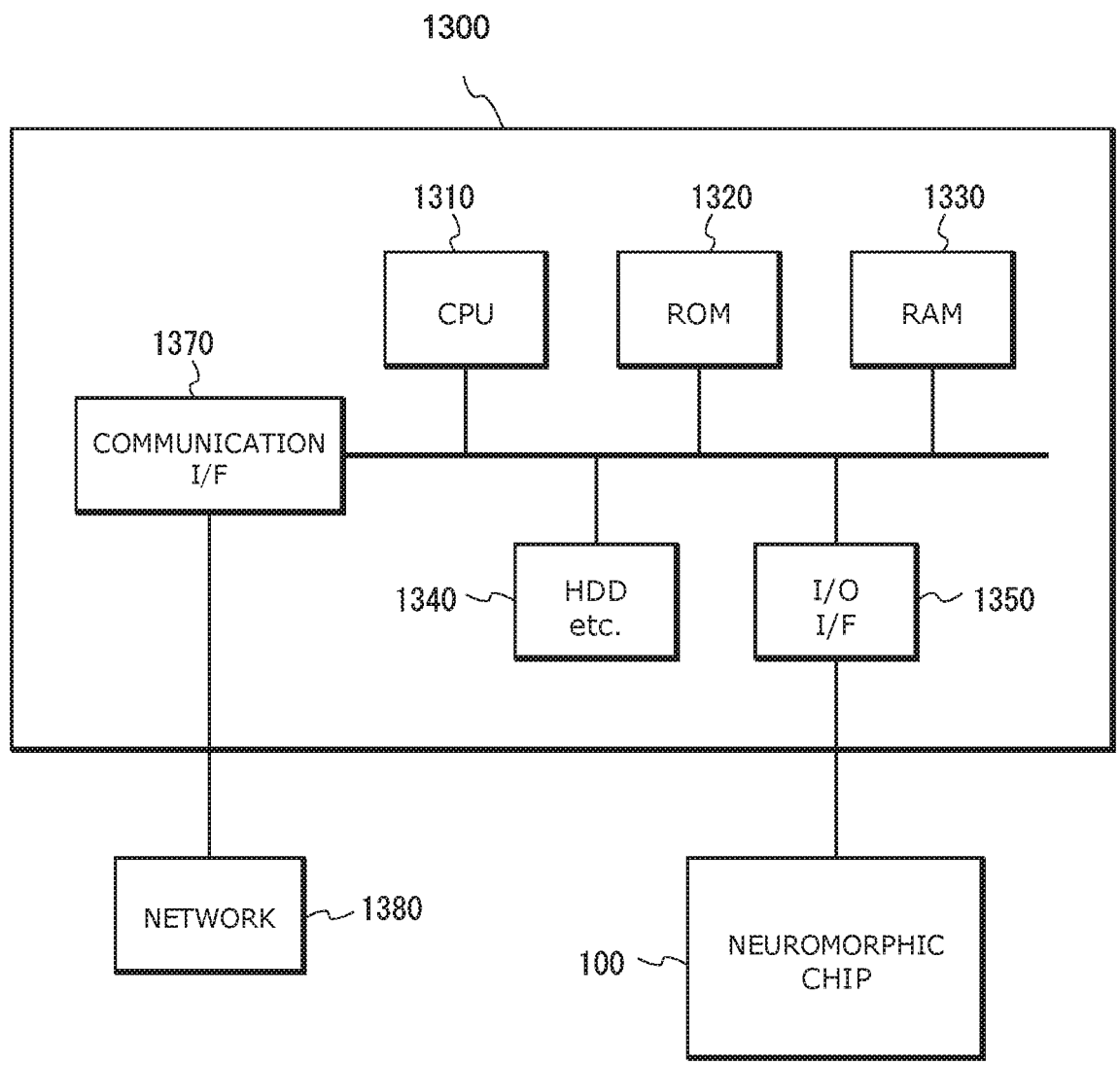
FIG. 13 shows an exemplary hardware configuration of a computer according to an embodiment of the present invention.

FIG. 13 shows an exemplary hardware configuration of a computer according to an embodiment of the present invention. A program that is installed in the computer 1300 can cause the computer 1300 to function as or perform operations associated with the neuromorphic chip 100 of the embodiments of the present invention or one or more sections (including modules, components, elements, etc.) thereof, and/or cause the computer 1300 to perform processes of the embodiments of the present invention or steps thereof. Such a program may be executed by the CPU 1310 to cause the computer 1300 to perform certain operations associated with some or all the blocks of flowcharts and block diagrams described herein.

The computer 1300 according to an embodiment of the present invention can include a CPU 1310, a and RAM 1330. The computer 1300 can also include input/output units such as an I/O interface 1350, a hard disk drive 1340, each of which can be connected to the host controller via an input/output controller. The computer can also include legacy input/output units such as a ROM 1320, which may be connected to the CPU.

The CPU 1310 can operate according to programs stored in the ROM 1320 and the RAM 1330, thereby controlling each unit. The I/O interface 1350 can communicate with other electronic devices via a network 1380. The hard disk drive 1340 can store programs and data used by the CPU 1310 within the computer 1300. The DVD-ROM drive can read the programs or the data from the DVD-ROM and provides the hard disk drive 1340 with the programs or the data via the RAM 1330. The ROM 1320 can store therein a boot program or the like executed by the computer 1300 at the time of activation, and/or a program depending on the hardware of the computer 1300.

A program is provided by computer readable media such as the DVD-ROM. The program can be read from a computer readable media, installed into the hard disk drive 1340, RAM 1330, or ROM 1320, which are also examples of computer readable media, and executed by the CPU 1310. The information processing described in these programs can be read into the computer 1300, resulting in cooperation between a program and the above-mentioned various types of hardware resources. The neuromorphic chip and its system 100, or method may be constituted by realizing the operation or processing of information in accordance with the usage of the computer 1300.

For example, when communication interface (I/F) 1370 is operated between the computer 1300 and a network 1380, the CPU 1310 may execute a communication program loaded onto the RAM 1330 to instruct communication processing to the communication I/F 1370, based on the processing described in the communication program. The communication I/F 1370, under control of the CPU 1310, can read transmission data stored on a transmission buffering region provided in a recording medium such as the RAM 1330, or the storage drive 1340 (e.g., the HDD, DVD-ROM drive or Flash drive), and transmit the read transmission data to network 1380 or write reception data received from network 1380 to a reception buffering region or the like provided on the recording medium.

In addition, the CPU 1310 may cause all or a necessary portion of a file or a database to be read into the RAM 1330, the file or the database having been stored in an external recording medium such as the hard disk drive 1340, etc., and perform various types of processing on the data on the RAM 1330. The CPU 1310 may then write back the processed data to the external recording medium.

Various types of information, such as various types of programs, data, tables, and databases, may be stored in the recording medium to undergo information processing. The CPU 1310 may perform various types of processing on the data read from the RAM 1330, which includes various types of operations, processing of information, condition judging, conditional branch, unconditional branch, search/replace of information, etc., as described throughout this disclosure and designated by an instruction sequence of programs, and write the result back to the RAM 1330. In addition, the CPU 1310 may search for information in a file, a database, etc., in the recording medium.

The above-explained program or software modules may be stored in the computer readable media on or near the computer 1300. In addition, a recording medium such as a hard disk or a RAM provided in a server system connected to a dedicated communication network or the Internet can be used as the computer readable media, thereby providing the program to the computer 1000 via the network 1380.

The present invention may be a system, a method, and/or a computer program product. The computer program product may include a computer readable storage medium having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry such as ASIC, FPGA, or programmable logic arrays (PLA) may execute the computer readable program instructions by utilizing state information of the computer readable program instructions to individualize the electronic circuitry, in order to perform aspects of the present invention. Specifically, the fan-out switch functions of the present embodiments may be embedded into the neuromorphic chips by technique of the electronic circuitry.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It should be apparent to persons skilled in the art that various alterations and improvements can be added to the above-described embodiments. It should also be apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As is made clear from the above embodiments, the present invention can realize the neuromorphic synapse array with a single polarity weight by subtracting output of the reference column array so that the neuron potential is ranged close to zero. With a limited control circuit or a unit embedded therein, the embodiments of the invention allow a scalable density of the neuromorphic array which is implemented with a single polarity weight cell.

What is claimed is:

1. A neuromorphic synapse array comprising:
a plurality of synaptic array cells being connected by circuitry such that the synaptic array cells are assigned to rows and columns of an array, the synaptic array cells respectively having a single polarity synapse weight, the rows respectively connected to respective input ends of the synaptic array cells, the columns respectively connected to respective output ends of the synaptic array cells, wherein the synaptic array cells are classified into operation synapse cells and reference synapse cells for shifting a product-sum of the operation synapse cells;
a plurality of operation column arrays being defined by the operation synapse cells aligned in a column of the array; and
a reference column array being defined by the reference synapse cells aligned in a predetermined column of the array, each cell of the reference column array connecting to a corresponding row of the synapse array configured such that weights of all of the reference synapse cells are set to average trained weights of all of the operation synapse cells that are updated during a learning phase.

2. The neuromorphic synapse array of claim 1, wherein each weight of the reference synapse cells is set to an average weight of all the operation synapse cells to receive a same signal aligned in the same row as the reference synapse cells.

3. The neuromorphic synapse array of claim 2, wherein the reference column array is embedded into a first side of the input ends of the neuromorphic synapse array such that each of the reference synapse cells is respectively connected to a first end of the input ends of the neuromorphic synapse array to receive the same signals as the operation synapse cells aligned in the same row.

4. The neuromorphic synapse array of claim 2, wherein the reference column array is embedded into a second side of the input ends of the neuromorphic synapse array such that each of the reference synapse cells is respectively connected to a second end from the input ends of the neuromorphic synapse array to receive the same signals as the operation synapse cells aligned in the same rows.

5. The neuromorphic synapse array of claim 1, wherein a product-sum value of the reference column array is subtracted from product-sum values at all of the output ends of the operation column arrays such that the product-sum values of all of the operation column arrays are shifted toward zero at all of the output ends of the neuromorphic synapse array.

6. The neuromorphic synapse array of claim 1, wherein a product-sum value of the reference column array is subtracted from product-sum values at all of the output ends of the operation column arrays such that the product-sum values of all the operation column arrays are dynamically moved in the range around zero.

7. The neuromorphic synapse array of claim 2, wherein an output end of the reference column array is configured to generate a digital signal based on a product-sum of the reference column array, the digital signal being applied to the output ends of all the operation column arrays; and
the output ends of all the operation column arrays are configured such that the product-sum value for the reference column array is subtracted from the product-sum values of all of the operation column arrays through the applied digital signal.

8. The neuromorphic synapse array of claim 7, wherein a digital signal is converted from an analog signal dependent on a product-sum of the reference column array through Analog to Digital Converter (ADC);
the digital signal is used to generate digital pulses in Pulse Width Modulate (PWM), Pulse Amplitude Modulate (PAM), and Pulse Number Modulate (PNM) schemes with a PG (pulse generator), the digital signal being applied to all of the output ends of the neuromorphic synapse array;
the output ends of all the operation column arrays are split into two lines, one line of the output ends is connected to a capacitor configured to accumulate a charge carried by a current dependent on the product-sum of each of the operation column arrays; and
another line of the output ends includes a transistor configured to be switched by the digital pulses to pull a current equivalent to a product-sum of the reference synapse array to a ground.

9. The neuromorphic synapse array of claim 2, wherein an output end of the reference column array includes a first transistor of a current mirror circuit configured such that a gate-source voltage is generated at a gate of the first transistor on the output end of the reference column array wherein the first transistor gives a current dependent on a product-sum of the reference column array, and
each output end of the operation column arrays includes a second transistor of the current mirror circuit paired with the first transistor on the output end of the reference column array configured such that a mirror current of the same amount as a current of the reference column array is generated at a gate-source of the second transistor on the output ends of the operation column arrays to subtract the mirror current from the current dependent on the product-sum values for all of the operation column arrays.

10. The neuromorphic synapse array of claim 9, wherein each of the output ends of all of the operation column arrays are split into two lines,
one line of each of the output ends is connected to a capacitor configured to accumulate charge carried by a current corresponding to a part of the product-sum of the operation column arrays, and
another line of each of the output ends includes a first transistor of the current mirror circuit paired with a second transistor to pull a mirror current dependent on a product-sum of the reference synapse cells to a ground.

11. The neuromorphic synapse array of claim 1, wherein the synapse cells include resistive devices capable of holding resistance values describing the single polarity synapse weight.

12. The neuromorphic synapse array of claim 11, wherein the synapse cells include resistive device including NVM (non-volatile memory).

13. A neuromorphic core comprising:
the neuromorphic synapse array of claim 5; and
activation function circuits respectively corresponding to the operation column arrays in the neuromorphic synapse array, each of the activation function circuits being respectively connected to the output ends of the operation column arrays;
wherein the activation function circuits receive the shifted product-sums to generate activated signals of the neuromorphic core.

14. The neuromorphic core of claim 13, further comprising post-synaptic neurons including the activation function circuits connected to the output ends of the operation column arrays, wherein the post-synaptic neurons respectively receive the activated signals and generate output signals outside the core.

15. The neuromorphic core of claim 14, further comprising pre-synaptic neurons respectively including a pulse generator, the pre-synaptic neurons being respectively connected to the input ends of the neuromorphic synapse array,
wherein the pre-synaptic neurons receive input data, convert the data into pulse signals to send the pulse signals to the neuromorphic synapse array.

16. The neuromorphic core of claim 15, further including one or more second neuromorphic cores of claim 15 being configured such that the post-synaptic neurons of a first neuromorphic core are connected in a one-to-one manner to the pre-synaptic neurons of the one or more second neuromorphic cores,
wherein the first neuromorphic core receives input data at the pre-synaptic neurons of the first neuromorphic core and generates the activated signals at the post-synaptic neurons of the one or more second neuromorphic cores.

17. The neuromorphic synapse array of claim 2, further comprising control-circuits for shifting its product-sum output after receiving signals from the input ends, wherein the control-circuits update a synapse weight for the operation synapse cells according to learning rules,
calculate average weights of all of the operation synapse cells to receive the same input aligned in the same row as the reference synapse cells,
update the weights of the reference synapse cells with the calculated weights,
check whether learning has been completed or not, and
shift product-sum values of the operation column arrays by subtracting a product-sum value of a reference column array from all of the product-sum values of the operation column arrays.

18. A neuromorphic processor comprising:
the neuromorphic core of claim 16; and
a controller for shifting synaptic weights in the neuromorphic cores, the controller being connected to at least one of the neuromorphic cores configured to transfer input data and output data through the pre-synaptic neurons and the post-synaptic neurons of the at least one of neuromorphic cores, wherein, the controller,
updates weights of the operation synapse cells,
calculates average weights of all the operation synapse cells to receive the same input aligned in the same row as the reference synapse cells,
updates the weights of the reference synapse cells with the calculated weights,
checks whether learning has been completed or not, and
shifts product-sum values of the operation column arrays by subtracting a product-sum value of a reference column array from all of the product sum values of the operation column arrays.

19. The neuromorphic processor of claim 18, wherein the controller is connected to a storage outside the core configured to transfer the input data and the output data between the storage and the neuromorphic core through the pre-synaptic neurons and the post-synaptic neurons.

20. A neuromorphic synapse array comprising:
a plurality of synaptic array cells being connected by circuitry such that the synaptic array cells are assigned to rows and columns of an array, including a reference column defined by reference synapse cells in a predetermined column of the array and a plurality of operation columns defined by operation synapse cells, wherein each of the synaptic array cells has a single polarity synapse weight, the rows are connected to respective input ends of the synaptic array cells, and the columns are connected to respective output ends of the synaptic array cells,
wherein each cell of the reference column array, connecting to a corresponding row of the synapse array, is configured such that weights of all of the reference synapse cells are set to an average of trained weights of all of the operation synapse cells.

* * * * *